US009928352B2

(12) United States Patent
Leonard et al.

(10) Patent No.: US 9,928,352 B2
(45) Date of Patent: Mar. 27, 2018

(54) SYSTEM AND METHOD FOR CREATING, PROCESSING, AND DISTRIBUTING IMAGES THAT SERVE AS PORTALS ENABLING COMMUNICATION WITH PERSONS WHO HAVE INTERACTED WITH THE IMAGES

(71) Applicant: Click Evidence, Inc., Oro Valley, AZ (US)

(72) Inventors: Jon N. Leonard, Oro Valley, AZ (US); Matthew W. Staker, Coto de Caza, CA (US); Robert P. Gille, Tucson, AZ (US); Joel C. Sercel, Lake View Terrace, CA (US); Jeffery S. Davis, Oro Valley, AZ (US); Claude A. Bailey, Plano, TX (US)

(73) Assignee: TAUTACHROME, INC., Oro Valley, AZ (US)

(*) Notice: Subject to any disclaimer, the term of this patent is extended or adjusted under 35 U.S.C. 154(b) by 287 days.

(21) Appl. No.: 14/821,602

(22) Filed: Aug. 7, 2015

(65) Prior Publication Data
US 2016/0070892 A1 Mar. 10, 2016

Related U.S. Application Data

(60) Provisional application No. 62/034,363, filed on Aug. 7, 2014.

(51) Int. Cl.
G06F 21/16 (2013.01)
G06T 1/00 (2006.01)
(Continued)

(52) U.S. Cl.
CPC ............ G06F 21/16 (2013.01); G06T 1/0021 (2013.01); H04L 63/0823 (2013.01);
(Continued)

(58) Field of Classification Search
CPC . G06F 21/16; H04W 12/04; H04N 21/25866; H04N 21/26613;
(Continued)

(56) References Cited

U.S. PATENT DOCUMENTS 5,499,294 A 3/1996 Friedman
5,799,082 A 8/1998 Murphy et al.
(Continued)

FOREIGN PATENT DOCUMENTS

WO WO0251126 A2 6/2002
WO WO2012162467 A1 11/2012

OTHER PUBLICATIONS

Evidence Pix Company Information, http://www.evidencepix.com/company.html (Dec. 2012).

Primary Examiner — Yonas Bayou
(74) Attorney, Agent, or Firm — Bacon & Thomas, PLLC

(57) ABSTRACT

A system and method for processing, storage, distribution, and interaction with electronic images created or captured by mobile devices having network communications capabilities, such as smartphones, allows a user whose image-displaying device includes enhanced viewer software to use an image displayed on the image-displaying device as a portal for communication with others who have interacted with the image, including authors and facilitators of the image. Watermarking and security measures are provided to enable source and content verification of a displayed image so that user morphing of imagery can be tracked to maintain stability of image-based interaction and so that malicious imagery tamper can be prevented.

29 Claims, 5 Drawing Sheets

(51) Int. Cl.
| | |
|---|---|
| *H04L 9/08* | (2006.01) |
| *H04N 5/232* | (2006.01) |
| *H04L 29/06* | (2006.01) |
| *H04L 9/32* | (2006.01) |
| *G06F 17/30* | (2006.01) |
| *H04N 5/44* | (2011.01) |
| *H04N 21/258* | (2011.01) |
| *H04N 21/266* | (2011.01) |
| *H04N 21/2743* | (2011.01) |
| *H04N 21/414* | (2011.01) |
| *H04N 21/4223* | (2011.01) |
| *H04N 21/426* | (2011.01) |
| *H04N 21/4788* | (2011.01) |
| *H04N 21/6377* | (2011.01) |
| *H04N 21/658* | (2011.01) |
| *H04N 21/81* | (2011.01) |
| *H04N 21/8352* | (2011.01) |
| *H04N 21/8358* | (2011.01) |
| *H04W 12/04* | (2009.01) |
| *H04W 12/02* | (2009.01) |

(52) U.S. Cl.
CPC . *H04N 21/25866* (2013.01); *H04N 21/26613* (2013.01); *H04N 21/2743* (2013.01); *H04N 21/41407* (2013.01); *H04N 21/4223* (2013.01); *H04N 21/42684* (2013.01); *H04N 21/4788* (2013.01); *H04N 21/63775* (2013.01); *H04N 21/6582* (2013.01); *H04N 21/8153* (2013.01); *H04N 21/8166* (2013.01); *H04N 21/8352* (2013.01); *H04N 21/8358* (2013.01); *H04W 12/04* (2013.01); *G06F 2221/0724* (2013.01); *G06F 2221/0737* (2013.01); *H04L 9/0825* (2013.01); *H04L 9/3247* (2013.01); *H04N 5/44* (2013.01); *H04W 12/02* (2013.01)

(58) Field of Classification Search
CPC ......... H04N 21/2743; H04N 21/41407; H04N 21/4223; H04N 21/42684; H04N 21/4788; H04N 21/63775; H04N 21/6582; H04N 21/8153; H04N 21/8166; H04N 21/8352
See application file for complete search history.

(56) References Cited

U.S. PATENT DOCUMENTS

| | | | |
|---|---|---|---|
| 5,862,218 A | 1/1999 | Steinberg | |
| 6,005,936 A | 12/1999 | Shimizu et al. | |
| 7,146,479 B2 | 12/2006 | Li et al. | |
| 7,161,479 B2 | 1/2007 | Sobol | |
| 7,207,480 B1 | 4/2007 | Geddes | |
| 7,535,352 B2 | 5/2009 | Sobol | |
| 8,107,668 B2 | 1/2012 | Lowe et al. | |
| 2009/0132527 A1* | 5/2009 | Sheshagiri | G06Q 30/02 |
| 2010/0013774 A1* | 1/2010 | Chen | G06F 3/0416 345/168 |
| 2011/0066929 A1* | 3/2011 | Karaoguz | G06F 3/0304 715/202 |
| 2011/0298700 A1* | 12/2011 | Ito | G06F 3/0346 345/156 |
| 2012/0120317 A1* | 5/2012 | Lee | G06F 17/30817 348/564 |
| 2012/0174169 A1* | 7/2012 | Nandiraju | H04N 21/252 725/93 |
| 2012/0210396 A1* | 8/2012 | Chung | G06F 17/2211 726/3 |
| 2012/0229587 A1* | 9/2012 | Sampathkumaran | H04N 21/4788 348/14.03 |
| 2013/0054700 A1* | 2/2013 | Allibhoy | G06Q 10/10 709/204 |
| 2013/0347018 A1* | 12/2013 | Limp | H04N 21/4826 725/19 |
| 2014/0317645 A1* | 10/2014 | Cheung | H04N 21/2668 725/10 |
| 2014/0317660 A1* | 10/2014 | Cheung | H04N 21/6175 725/44 |
| 2014/0372403 A1* | 12/2014 | Liu | G06F 17/30864 707/706 |

* cited by examiner

SYSTEM AND METHOD FOR CREATING, PROCESSING, AND DISTRIBUTING IMAGES THAT SERVE AS PORTALS ENABLING COMMUNICATION WITH PERSONS WHO HAVE INTERACTED WITH THE IMAGES

This application claims the benefit of U.S. Provisional Patent Appl. Ser. No. 62/034,363, filed Aug. 7, 2015.

BACKGROUND OF THE INVENTION

1. Field of the Invention

The invention relates to processing, storage, distribution, and interaction with electronic images, and in particular to the processing, storage, distribution, and interaction with images created or captured by mobile devices having network communications capabilities, such as smartphones.

The invention enables a user whose image-displaying device includes enhanced viewer software to use an image displayed on the image-displaying device as a portal for communication with others who have interacted with the image, including authors and facilitators of the image. Watermarking and security measures are provided to enable source and content verification of a displayed image so that user morphing or modification of imagery can be tracked to maintain stability of image-based interaction and so that malicious imagery tamper can be prevented.

The invention is implemented by a combination of at least one image creating device that includes imaging software for creating and processing an image in a way that enables both content and source verification, at least one image viewing device that includes the aforementioned enhanced viewer software, and a cloud service that supports source and content verification of the images and interactivity between imagery viewers, authors, facilitators, and/or others who have interacted with the image. The cloud service associates each picture with a record of interactions with the image, and a record containing information on users who have interacted with the image. The cloud service then uses these records to create an interactive billow. The interactive billow is an interactive entity displaying the image together with other potentially user-interesting imagery and a mechanism permitting user-interaction with other viewers of the subject imagery or viewers of the other potentially user-interesting imagery via a text, audio or video dialog box or other interactive mechanism.

2. Description of Related Art

Smartphones, by virtue of their ever improving imaging capability and their powerful sharing capabilities, are generating much of the imagery seen in the world today. Because of the sheer volume of imagery being created and the fact that people with smartphones (meaning iPhones™, Android™ smartphones, and other smartphones, as well as tablets, Apple™ watches and other portable image-creating and displaying devices with network communications capabilities) are essentially everywhere all the time, the potential for this imagery to be a game changer to effective interaction between people is high.

However, it is frequently the case that when a smartphone user runs across interesting imagery on the web, the user will not know who the author is, who else may have seen it, or what others may think about it. For this reason while effective interaction between people is no doubt improved by the facile imaging of smartphones, it is far from an effector of interaction between people who are not already connected in some way. Nevertheless, it turns out that the smartphone platform is inherently the right tool to greatly expand not only the numbers of pictures that people broadcast, but also to greatly expand effective interaction between people via these pictures.

Smartphone technology has now advanced to the stage, that if smartphone imagery were protected and robustly marked as it was created, and properly serviced by a cloud system designed for the purpose, it would be possible for viewers of smartphone imagery everywhere to readily and safely interact with the authors and viewers of smartphone pictures from every source.

At present, all smartphones and all digital pictures are subject to malicious tamper. Therefore, for reliable improvement of wide people-interaction coming from smartphone imagery, much care must be taken to protect the software in the smartphone that would do the robust marking, as well as the marking itself that is placed on the imagery. Copending U.S. patent application Ser. No. 13/971,527, filed Aug. 20, 1013 and published as U.S. Patent Publication No. 2014/0049653 on Feb. 20, 2014, discloses a system for marking images in a way that enables content and source verification, while a number of additional techniques are available to protect and verify the image-creation software and provide added security during creation, transmission, and storage of the images. The present invention provides a platform that takes human interaction with imagery one step further, by not only providing for creation, storage, and distribution of secured and therefore stabilized imagery, but for using the imagery as a platform that enables stable and trustable interaction between a viewer of the imagery and authors/facilitators, as well as other viewers, of the imagery.

SUMMARY OF THE INVENTION

It is accordingly an objective of the invention to provide a reliable way to make it possible for viewers of electronic images to readily and safely interact with the authors and other viewers of the images.

The system is implemented on specially programmed hardware, including in a preferred embodiment, an image creating device having image creation and network communications capabilities, and imaging software that takes over and performs the usual imaging functionality for the device, but that adds specialized functionality not present in existing devices, the added functionality including:

a. security measures adapted for imagery-based communications;

b. image capture integrity measures;

c. steganographic and/or imaging marking capabilities;

d. imaging action data creation measures; and e. secure transmission capabilities.

The specially programmed hardware further includes an image viewing device having image displaying and network communications capabilities, and viewer software that enables the user of the image viewing device to interact with images and use the images as portals to communicate with other persons who have interacted with the images. This interaction allows the user to:

a. know via a cloud service that the images is a valid picture equipped for interaction;

b. determine who else has been or is presently interested in the picture;

c. open a communication channel for the user to communicate directly with amenable others and/or leave commentary for others to see or hear; and d. empower the user, subject to a registration process, to submit images that were not created by the above-described imaging software to be subjected to a marking process analogous to the marking done by the imaging software (in which case the user is termed the picture's "facilitator" rather than its author).

The specially programmed hardware further includes one or more servers and other equipment for implementing the cloud service, the hardware being programmed to interact with image-creating and image-viewing software in the image creation and viewing devices to act as a communications portal between and among viewers of images created by the image-creating software, and that further adds specialized functionality not present in existing communications portals, including:

a. constructing and maintaining a unique picture interaction data structure (PIDS) that captures ongoing interactions that happen between image viewers and image authors/facilitators relative to an image;

b. constructing and maintaining a user interaction data structure (UIDS) that contains a user's identification information and preferences, and pointers to images with which the user has interacted;

c. generating a picture-generated recursive data structure (PRIDS) relative to any given image, the PRIDS containing the PIDS of the image and the UIDS of the users who have interacted with the image (which in turn contains the PIDS's of all other images with which the users have interacted, which in turn contains the UIDS's of users that have interacted with those images, and so forth);

d. generating a truncated version of the PRIDS and providing the truncated version of the PRIDS to a user's image display device for presentation to, and interaction with, the user, thereby making possible interaction with other users who have interacted with an image and/or its author(s)/facilitator(s); and e. receiving images from imaging software on the image creating device(s), viewing software on the image displaying device(s), and from image creating and viewing devices that lack the imaging or viewing software but whose viewers wish to take advantage of content and source verification and interactivity services provided by the cloud service.

It will be appreciated that although the present invention is described with reference to programmable mobile communications devices or "smartphones," the invention may also be applied to any programmable devices with image creating, image displaying, and network communications capabilities, including but not limited to iPhones™, Android™ smartphones, and other smartphones, as well as iPADs™ and other tablets, Apple™ watches, laptop and notebook computers, and desktop or personal computers (PCs).

In addition, the term "image creation" refers to both capture of a still image or video by conversion of light from an object or scene into electronic signals, i.e., photography or videography, as well as the creation or generation of an image by other means such as by using software to draw or paint a picture, modify an existing image or images, or assemble an image from other images.

Still further, while the preferred embodiment of the invention utilizes a "cloud service," and therefore Internet communications, the invention is not limited to implementation on the Internet or World Wide Web, or to a particular form of electronic communications. The term "cloud service" refers to any network connected device or devices, programmed in the manner described below with instructions for carrying out the cloud service functions of the present invention.

DETAILED DESCRIPTION OF THE PREFERRED EMBODIMENTS

Figure 1:
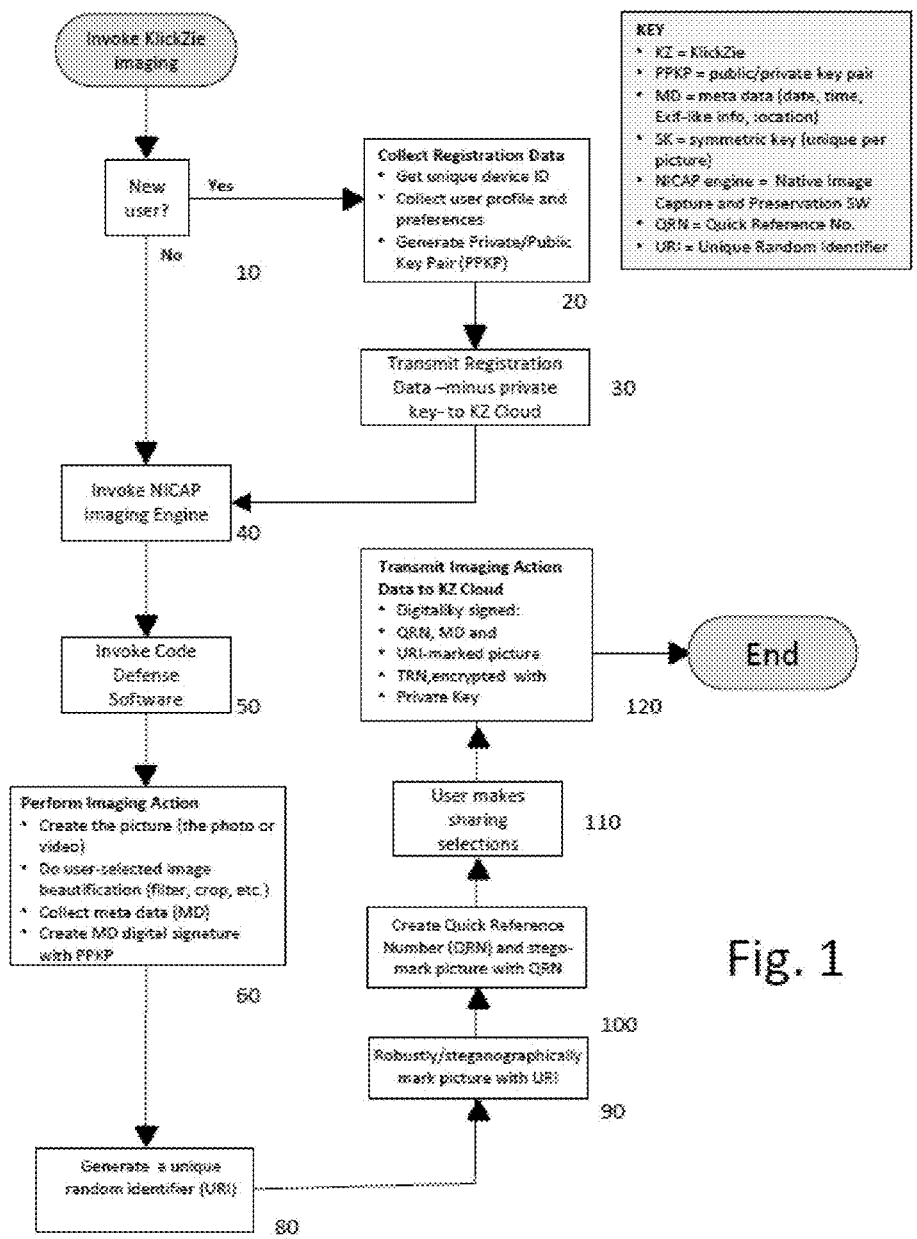
FIG. 1 is a flow diagram of imaging software for execution by a first mobile device in accordance with principles of a preferred embodiment of the invention.
Figure 2:
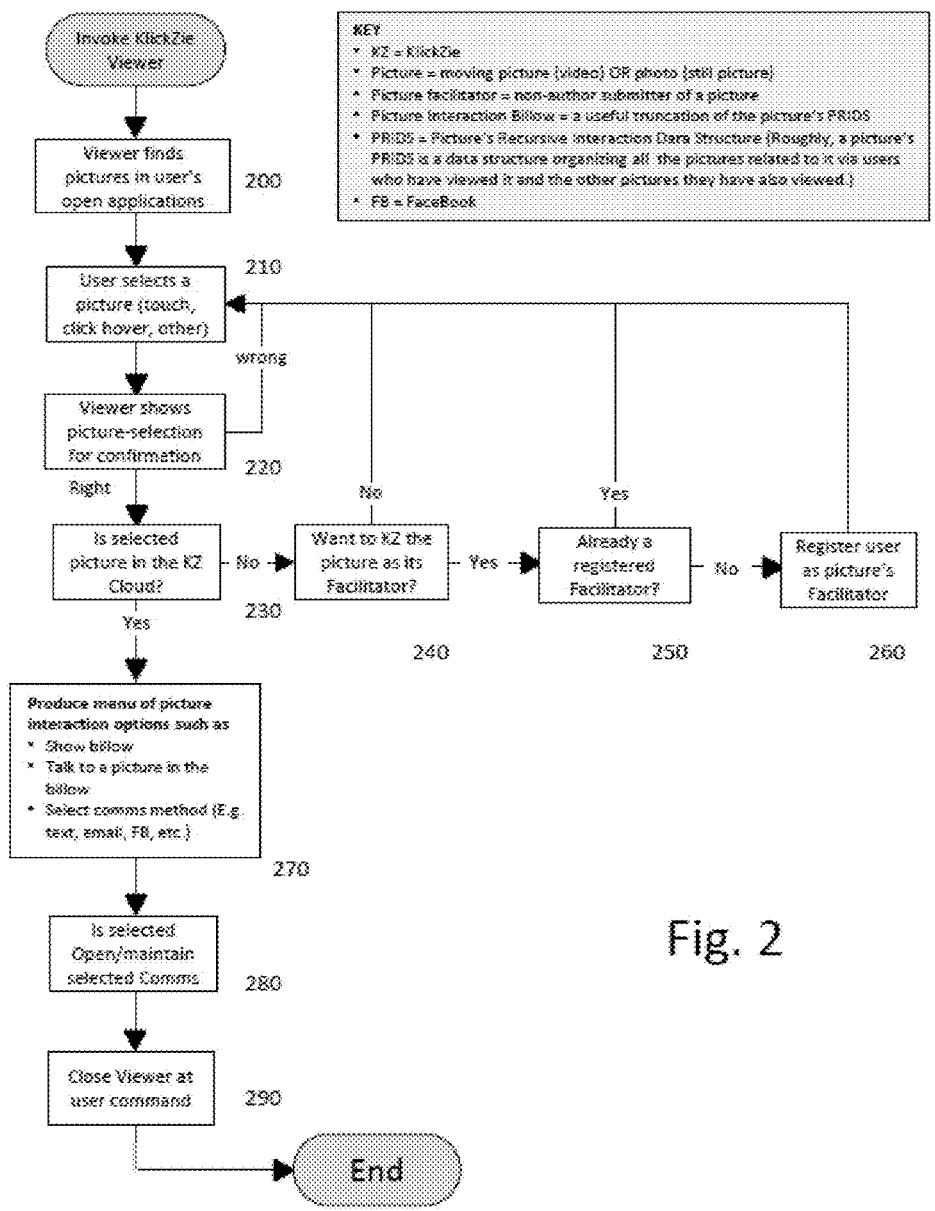
FIG. 2 is a flow diagram of viewing software arranged in accordance with the principles of the preferred embodiment.
Figure 3:
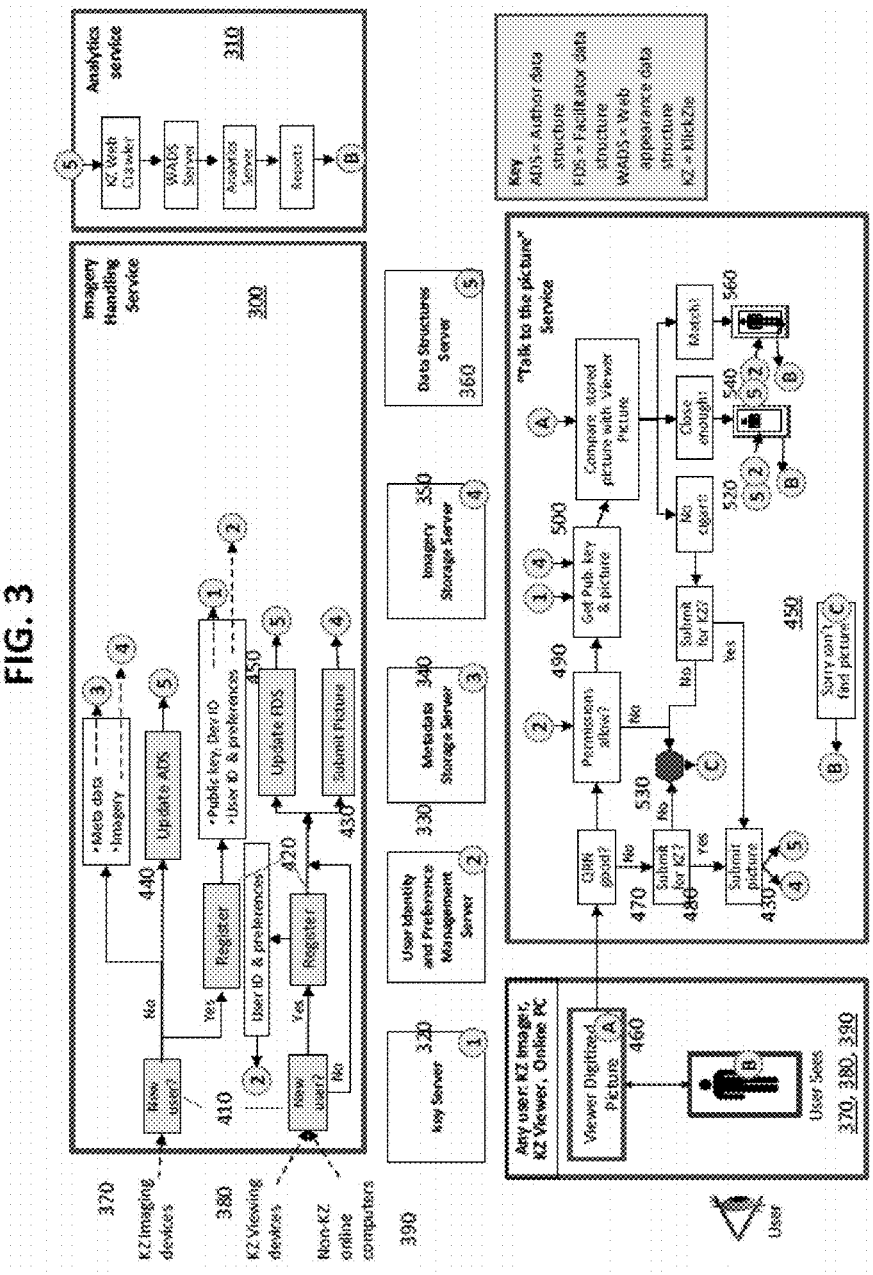
FIG. 3 is a flow diagram of a cloud segment for facilitating image interaction in accordance with the principles of the preferred embodiment.

A preferred system of processing, storage, distribution, and interaction with images includes image creating devices having the imaging software illustrated in FIG. 1, image viewing devices having the viewing software illustrated in FIG. 2, and an Internet cloud service that communicates with the image creation and viewing devices to provide image processing, storage, distribution, and interaction capabilities, as illustrated in FIG. 3. It is to be understood that the image creating and image viewing devices need not be separate devices, i.e., that mobile and other image creation/display devices utilized by the present invention may include both imaging and viewing software, and that the devices are illustrated as separate devices for illustrative purposes only.

As explained above, the image creating devices may be conventional smartphones or other programmable device capable of creating an image, for example through the use of a camera lens and CCD, and also of being programmed to process the image, for example by storing software in a memory and using a processor to execute instructions contained in the software. Upon programming with imaging software of the type illustrated in FIG. 1, the programmable image creation devices become specialized devices capable of security measures adapted for imagery-based communications; image capture integrity measures; steganographic and/or imaging marking capabilities; imaging action data creation measures; and secure transmission capabilities.

The imaging software may be downloaded or manufacturer-supplied in chip or software form and, in the viewing software embodiment illustrated in FIG. 1, is for use in consumer-oriented Internet-connected mobile communications devices such as smartphones, tablets, and internet-connected digital still or video cameras. The user of the image creating device will be referred to herein as the author of the imagery created by the device.

As illustrated in FIG. 1, the imaging software takes over and performs the usual imaging functionality for the device, but adds specialized functionality not present in existing devices. Details of the conventional image capture/creation functionality, such as display of scenes viewed through a lens, control of a shutter, and conversion of electronic signals from a CCD into an image, are not shown in FIG. 1 but will be familiar to those skilled in the art.

The added specialized functionality provided by the illustrated embodiment of the present invention includes security measures adapted for the imagery-based communications of the preferred embodiment, implemented by steps 40 and 50, described in more detail below. The specialized function also includes collection of a user-profile and preferences and a unique device ID, and generation of a private/public key pair (PPKP) for the unique device, implemented in step 20.

Step 20 involves a substep of reading of a unique ID provided in each imaging device, a substep of having the user input profile information and preferences, and a substep of generating a private/public key pair and securely storing the private key, each of which can be carried out by well-known apps or software subroutines. Since the keys generated and information collected in this step may be stored on the image creation device, the step only needs to be performed once, and therefore an initial step 10 of determining whether the imaging software is being used for the first time is carried out before proceeding to step 20. If step 20 has previously been performed, the imaging software proceeds directly to step 40.

Upon carrying out step 20, the imaging software transmits the user-profile and preferences, the unique device ID, and the public key to the cloud service illustrated in FIG. 3 (or to a corresponding key management server), as indicated by step 30. As explained below, the cloud service can use the public key and/or make it available to other viewers for authentication of communications from the user of the imaging software, while the user-profile and preferences are used to construct an Author Data Structure establishing a secure user homepage for sharing, interacting with and otherwise managing the imagery authored by the user. The private key does not need to be transmitted with the public key, but may optionally be password protected at the device and provided to the cloud service or to another key management server to handle lost device issues.

Step 40 invokes a Native Imagery Capture and Preservation (NICAP) engine to implement the imagery creation operation and imagery-capture integrity preserving functions. The NICAP engine consists of trusted code known to be free of hidden mal-code and designed to securely capture the original camera imagery without the possibility of malicious tamper. The NICAP engine performs functions related to image capture (step 60), with additional measures performed by code defense software included in the NICAP engine to ensure that the code that performs the image capture function has not been hacked, engineered, or spoofed (step 50). Advanced techniques for reverse engineering prevention in smartphones are commercially available from Arxan, Inc. and others, and step 50 may optionally include, but is not limited to, any of the following known techniques:

code obfuscation by which program code and its control flows are transformed into an unintelligible form;
symbol stripping by which unused program symbols are stripped from binaries.
symbol renaming by which program symbols that cannot be removed are renamed with irrelevant or gibberish name;
hiding clear text string encodings through encryption;
inserting code logic that will detect the use of debuggers, by which action against the attacker can be taken in the smartphone and in the cloud;
detecting tamper with added logic by which code and data changes can be detected (through checksum logics, e.g.);
erasing and restoring tampered code with logic added to isolate, remove and restore tampered code and data;
providing code to alert the cloud of tamper incidents and their details; and/or
providing layering that "protects the protection code" in the same way that the code is protected. Multiple layers of this type will seriously increase the code hardening to attack.

In step 60, the NICAP engine performs the imaging action (for example, takes a photo or video) with the invoked code. In the following description, the term "picture" shall refer to either a "photo," i.e., a still picture, or a video, i.e., a moving picture. In particular, in step 60, picture metadata (EXIF-like data, time, date and GPS) is collected and signed with (PPKP) steganographic and robust marking of the created imagery using the following steps:

In step 80, a unique random identifier is generated by performing the substeps of:
(i) generating a true random number (TRN) based on random variations existing in the smartphone's sensor signals and/or other random variations available from within the smartphone, and
(ii) using the TRN as a random selector to select a robust, seriously undetectable HUGO-like steganographic marking algorithm from among a suitably parameterized infinite class of such algorithms, this HUGO-like steganographic marking algorithm serving as the Unique Random Identifier (URI) unique to the created imagery.

It is also within the scope of the invention to use a conventionally generated true random number as the URI—such as the TRN itself, but using such a random number to watermark the image provides weaker protection from penetration than use of the TRN selected HUGO-like steganographic marking algorithm.

The imagery is robustly and steganographically watermarked using the URI (step 90). In this step, robustness is achieved by spreading the watermark through the imagery in such a way that the URI can be retrieved from a small fragment of the image. Robustness enables the watermark to survive compression, scaling, cropping and other image processing so that the cloud software illustrated in FIG. 3 can identify the imagery whenever and wherever it may show up, making interaction with the imagery independent of place and time. HUGO-like steganography hides the watermark making it hard for anyone but authorized viewer and cloud software implementing the present invention to find. This steganography is aimed at preventing a malicious third party from tampering with the imagery, an important feature for stable communication between and among viewers and authors of imagery.

A Quick Reference Number (QRN) unique to the imagery is created for use in easy tracking of the imagery within the device and in the cloud, and the imagery is steganographically watermarked with the QRN (step 100). Further details on the use of a QRN to steganographically watermark an image (and on the collection and use of metadata to verify source and content) can be found in the above-cited U.S. Patent Publication No. 2014/0049653, incorporated herein by reference.

In step 120, the QRN, the URI-watermarked imagery taken in the imaging action, the collected metadata such as the EXIF data that accompanies photos and EXIF-like data that could be collected for videos, time and date, and location data, are digitally signed, and the TRN is encrypted with the Private Key created in step 20 for unlocking the URI. This is the Imaging Action Data Package, which is then transmitted to the cloud service illustrated in FIG. 3 using the image creation device's baseband radio processor and CPU.

Turning to FIG. 2, the preferred image viewer software or "viewer" is a downloadable application for any device with internet access that is capable of interactively displaying images, such as a PC, laptop, tablet, smartphone, etc. With the viewer software, the computer becomes a viewing device that enables the user to use pictures created by the imaging software of FIG. 1 and distributed by the cloud service of FIG. 3 as portals to talk to or communicate with others who have interacted with the pictures. This is made possible, as described below, through the use of a "billow," which is a package of data created and managed by the cloud service of FIG. 3 that includes information on other viewers, authors, and/or facilitators associated with the images, as described below. The viewer allows a user who comes across an interesting picture that has been created, processed, and distributed in accordance with the principles of the present invention (referred to herein as a "valid picture") to "talk to the picture." This means that the viewer will capture and display the picture, determine via the cloud service that it is a valid picture, and further determine who else has been or is presently interested in the picture, such as the author of the picture or other viewers of it. If the picture has been determined to be a valid picture, the viewer opens a communication channel (such as for instance a dialog box imbedded right in the picture, or an audio link or a video link) for the user to communicate directly with amenable others and/or leave commentary for others to see or hear.

The viewer also empowers the user, subject to a registration process, to submit pictures other than those created, processed, and distributed according to the present invention, to be subjected to a marking process by the cloud service analogous to the marking done by the above-described imaging software. In this case the user is termed the picture's "facilitator" rather than its author. Mirroring the step described below in which the cloud service of FIG. 3 creates an Author Data Structure for the author of pictures, the cloud service can create a Facilitator Data Structure for the facilitator of pictures, along with a secure user homepage for sharing, interacting with and otherwise managing the facilitator's related pictures.

When invoked, the viewer software illustrated in FIG. 2 begins with step 210, which allows the user to select encountered imagery by touch, mouse click or other selection technology whenever the user, in step 200, encounters a picture from any source, such as an email, a text, or a webpage.

In step 220, the viewer then feeds back to the user the selection (by outline, highlighting or other technique) allowing the user to confirm the selection.

In step 230, the selected imagery is transmitted to the cloud service of FIG. 3 to determine whether or not it is valid imagery, i.e., whether it has been created, processed, and distributed in accordance with the principles of the present invention. If not, the imagery can still be transmitted to the cloud service for processing and marking as valid by selecting the marking option in step 240. If the user of the viewer software is already a registered facilitator, as determined by step 250, the cloud service will process and mark the imagery as valid and the image will then be treated as if it had been created by the imaging software of FIG. 1. If the user has not registered, the user is invited to register as a facilitator as step 260, after which the cloud service creates a Facilitator Data Structure for the user, along with a secure user homepage for sharing, interacting with and otherwise managing the facilitator's related pictures, and the imagery is processed and marked as valid for further treatment by the viewer as valid imagery.

In step 270, by touch-and-hold, right-mouse-click or other technology the viewer will provide a menu of actions for the user, including the option, if the imagery is valid imagery, of interacting with the imagery via the imagery's "Interaction Billow" or interaction information data structure as described below in connection with FIG. 3. As may be further understood from the description of the Interaction Billow presented below in connection with FIGS. 4-6, the Interaction Billow allows the user to, by way of example and not limitation:

leave a comment in the imagery's Billow;
communicate about the imagery directly, live or otherwise, with amenable others listed in the imagery's Billow;
view and comment on other pictures showing up in the imagery's Billow; and
interact in any other ways with the imagery and people in the Billow as may be provided by the system of the preferred embodiment.

If the communication option is selected, step 280 of the viewer software interacts with the cloud service of FIG. 3 to open a communications channel to another person selected by the user based on a display of information included in the Billow, as described in more detail below, and maintain the communication for so long as desired. Consequently, the image acts a portal to another person associated with the image as a viewer, facilitator, or author. When the communication has been completed, the user may close the viewer software upon command, as indicated by step 290.

Turning to FIG. 3, the invention provides a cloud service that enables, generates and supports community building interactivity between imagery viewers and/or imagery authors/facilitators. This interaction is intended to allow any given piece of valid imagery, i.e., imagery that has been created, processed, and distributed by the cloud service and the imaging software as described above, no matter where it may appear in any place or any time after its creation, to act as a communications portal between and among the viewers of the imagery and the author/facilitator of the imagery.

As illustrated in FIG. 3, the cloud service may be divided, for purposes of illustration, into an imagery handling service 300 and an analytics service 310. These services may utilize hardware in the form of a key server 320, a user identity and preference management server 330, a metadata storage server 340, an imagery storage server 350, and a data structures server 360. Although illustrated as discrete services and hardware, it will be appreciated by those skilled in the art that the services may be performed by any combination of hardware devices, including multiple devices to whom tasks are distributed on the basis of traffic or demand, and that the servers also may be separate, combined, or distributed devices. The cloud service of FIG. 3 is connected via the Internet to image creation devices 370 having the imaging software of FIG. 1, viewing devices 380 having the viewing software of FIG. 2, and other devices 390 that have not yet been registered and provided with the imaging and viewing software.

In FIG. 3, circled numbers 1-5 indicate data or information flow and the letters KZ, which is an abbreviation of the registered trademark KlickZie, are used as a shorthand to indicate software that complies with the principles of the present invention, and images created, processed, and distributed in accordance with those principles. Furthermore, the term "non-KZ" in FIG. 3 refers to images that have not yet been created, processed, and distributed using the imaging software of FIG. 1 and the cloud service of FIG. 3. However, it is to be understood that the terms KlickZie™ and KZ are not to be taken as generic terms for either the software or images.

In order to enable imagery to be used as a portal for communications with and among viewers of a picture, and with authors and/or facilitators the cloud service creates and associates with each picture a Picture Interaction Data Structure (PIDS) and with each user a User Interaction Data Structure (UIDS), which are combined by the cloud service to create a picture's Picture-generated Recursive Interaction Data Structure (PRIDS). The PRIDS is then used to create an Interaction Billow that is provided by the cloud service to the viewer software for use in providing a communication option for the picture, as described above in connection with step 270 of FIG. 2.

According to the preferred embodiment of the present invention, each picture gets a Picture Interaction Data Structure (PIDS). For each picture managed by the cloud service, the cloud service constructs and maintains a unique PIDS that captures the ongoing interactions that happen between imagery viewers and/or imagery authors/facilitators relative to that picture. Several types of interactions may be tracked, including both one-on-one communications and group chats, and several types of communication channels may be provided, such as text, email, talk or video. The PIDS for each given picture contains the QRN of the picture, and for each interaction type that occurs, the user IDs and interaction preferences of the users involved, and pointers to the stored contents of the communications in each communications channel employed.

The cloud service also constructs and maintains a User Interaction Data Structure (UIDS) for each registered user, whether author, facilitator or merely spectator. The UIDS contains the user's ID and preferences and pointers to pictures with which the viewer has interacted and that have been created and processed by the imaging software of FIG. 1 and/or imagery handling service 300.

The PIDS's and UIDS's maintained by the cloud service enable the cloud service to generate the Picture-generated Recursive Interaction Data Structure (PRIDS) relative to any given picture. The PRIDS for a picture contains the PIDS of the picture and the UIDS of the registered users who interact with the picture. These UIDS in turn contain the PIDS of the other pictures with which those users have interacted. These other pictures in turn contain the UIDS of all the users who have interacted with them, and so on. The PRIDS for a picture could include a high share of all the registered users and pictures processed by the cloud service, showing all the interactions among them.

The image and user interaction tracking capabilities of the full PRIDS has clear and important analytics uses, which are carried out by analytics service 310. For example, the cloud service can track the appearance of pictures across the internet. Web crawling servers controlled by the cloud service can create a Web Appearance Data Structure (WADS) providing the web appearances by picture, author and facilitator. Statistics derivable from WADS can be used for a variety of purposes, as will be understood by those skilled in the art of Internet data mining and collection.

Figure 4:
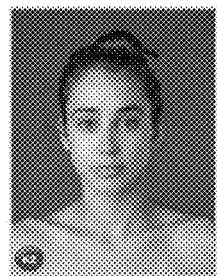
FIG. 4 is an example of an image with which a user wishes to interact.
Figure 5:
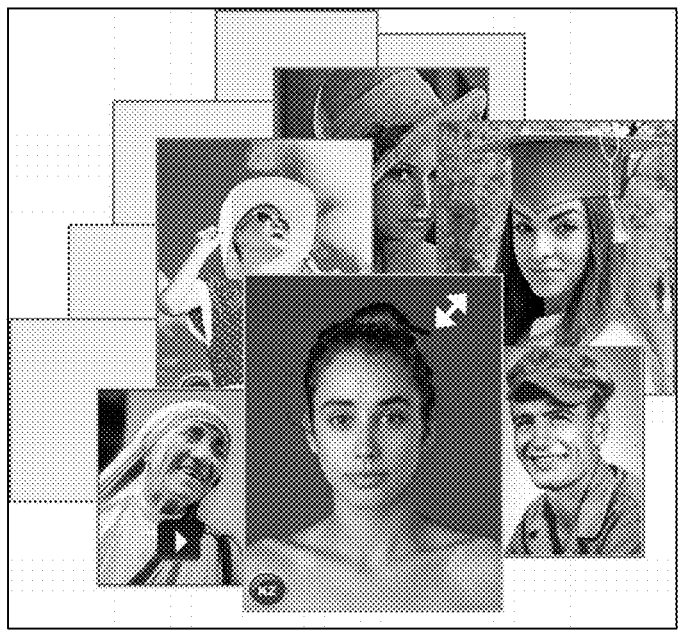
FIG. 5 illustrates one manner in which a truncation of a picture-generated recursive interaction data structure (PRIDS), also known as an "interaction billow," may be presented for the image of FIG. 4, in accordance with the principles of the preferred embodiment.
Figure 6:
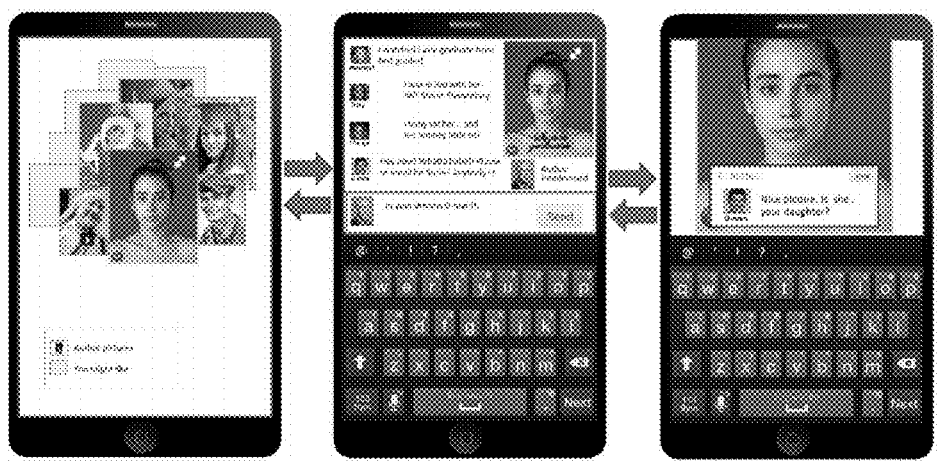
FIG. 6 illustrates a dialog with the interaction billow of FIG. 5, in accordance with the principles of the preferred embodiment.

To enable interaction by individual users with a particular picture, the cloud service creates truncated versions of the PRIDS. The truncated versions of a picture's PRIDS are the Interaction Billows of the picture, which are utilized by the viewer software of FIG. 2 to provide a user with the option of using the image as a portal to interact with other viewers, author's or facilitators. While the Interaction Billow is preferably a truncated version of the PRIDS to facilitate implementation on a user device, it is also within the scope of the invention to use a non-truncated version of the PRIDS as the Interaction Billow, depending on the information contained in the PRIDS, the status, permission level, or authorization of the registered user, and the storage and processing capabilities of the viewing device. FIGS. 4-6 illustrate the manner in which the Interaction Billow is presented after being associated with a picture or image by the imagery handling service 300 of FIG. 3.

The Interaction Billow is used when a registered user comes upon an interesting picture with which to interact, perhaps like the one shown in FIG. 4. If the picture has been processed by the cloud service, then it has been embedded with a highly interactive Interaction Billow by using the PRIDS data structure maintained by the cloud service.

FIG. 5 illustrates how a picture's Interaction Billow might be presented. The picture of interest is the one presented in the foreground. The Interaction Billow is the picture plus the set of pictures around it. In this billow presentation, the pictures clustered closely around the picture of interest could be other pictures of the author. Those further out could be related pictures by other authors. A billow could also be presented in many other ways, such as for example as a linear arrangement with the picture of interest highlighted in some way such as by size, brightness or outline.

The truncation of the PRIDS used in creating an Interaction Billow may be made on the basis of the popularity of the pictures retained, on the similarity of the retained pictures to the picture of interest, on the similarity of the pictures to others with which the user is interacting, on knowledge of the user's interests, or on any other factor that will appeal to the user. In the example of FIG. 6, in which the viewing device is illustrated as a Samsung smartphone, the user can touch the picture of interest or any other picture in the billow and begin a dialog with the selected picture. A one-to-many dialog with the picture of interest is shown at center, and a one-to-one dialog with the picture of interest is shown at right. The user can go back to the billow and interact with any other picture any time, creating new interaction billows.

The circled KZ symbol shown at the bottom left of the picture of interest is an example of a visible mark that could be used to let viewers everywhere know that they are seeing an interactive picture that has been created and/or processed by the system of the invention, and that they therefore can interact with or "talk to the picture." Naturally such a mark could be optional to the author or facilitator of the picture, who for esthetic reasons may wish to suppress the mark. Because the interactive pictures are steganographically marked, the cloud service can identify a picture created and processed in accordance with the invention with or without a mark, and whether or not a visible symbol is present.

Returning to FIG. 3, the imagery handling service 300 of the cloud service receives imagery from three sources: 1.) an imaging device 370 including the imaging software of FIG. 1 and transmitting newly created imagery, 2.) a viewing device 380 including the viewing software of FIG. 2 and transmitting imagery with which the user at the viewing device wants to interact, and 3.) a device 390 that lacks either the imaging software of FIG. 1 or the viewing software of FIG. 2, and which can be any smartphone, tablet, or Internet-connected computing or image-creating or viewing device. The cloud service handles the imagery coming from these sources as follows:

Block 410 indicates the receipt of data from an imaging device that includes the imaging software of FIG. 1. Registration data for a new user is handled by block 420, which collects a user and device ID and preferences, as well as a user's public key and, optionally, a private key of the user, as described above in connection with steps 20 and 30 of FIG. 1. Image related data for a registered user, including image metadata and URI marked images created by steps 60-120 of FIG. 1 are handled by block 430. In addition, as indicated by block 440, the user's Author Data Structure (ADS) is updated to reflect the uploaded imagery. The image metadata is sent to the metadata storage server 340, while the robustly and steganographically marked images are provided to the imagery storage server 250 for storage and to the data structure server 260 for inclusion of an Interactive Billow.

Pictures received through the viewing software of FIG. 2 or a device 390 that does not include the imaging software of FIG. 1 are also handled by blocks 310 to 330, with the difference that the user is treated as a "facilitator" in accordance with steps 340-360 of FIG. 2 and block 440 of FIG. 3. In block 440, a Facilitator Data Package is created, along with a secure user homepage, or a user's existing Facilitator Data Package is updated. Step 430 marks the picture and again sends the picture to the imagery server 350 for storage and to the data structures server 360. By going to the website associated with the cloud service, any person can (a) upload any imagery for determining if the imagery is imagery created by the imaging software or marked by the cloud service, (b) register as a facilitator of the imagery which is then marked, (c) interact with imagery in the system, or (d) download the imaging software of FIG. 1 or the viewer software of FIG. 2.

Block 450 in FIG. 3 indicates the "talk to the picture" service provided by the cloud service, i.e., the procedure for generating an Interaction Billow and providing it to a viewer of an image for use in communicating with other viewers and/or the authors or facilitators associated with the image, as described in connection with FIG. 2.

When a user of the viewing software illustrated in FIG. 2 encounters a picture of interest 460, the picture is uploaded by the viewing software to the cloud service. In block 470, the cloud service checks whether the picture contains a valid Quick Reference Number (QRN), which is generated by the imaging software in step 100 of FIG. 1. If not, the picture may still be marked and deployed into the Data Structures Server if it meets formatting and other technical requirements, as determined by block 480, and then submitted via block 430 for marking, processing, and storage, as described above. If a valid QRN is found, indicating that the picture has previously been marked and stored, the cloud service may optionally check via block 490 whether processing of the picture for interaction is permitted or authorized and, if permitted or authorized, (if the author/facilitator has opted for image encryption the cloud service retrieves the user's public key via block 500 uses it in block 510 to decrypt the picture) compares the picture in question for source and content validation by comparison with a stored version of the picture. If the picture fails the comparison, it may be submitted for marking via blocks 520 and 430 or a failure message may be sent to the viewing software as indicated by block 530. If the comparison partially validates the source and/or content, the picture may still be provided with an Interactive Billow, as indicated by blocks 540 and 550. If both source and content are fully validated, the picture is provided with an Interactive Billow as indicated by steps 560 and 550. In either case, the resulting image 570 with the Interactive Billow is transmitted back to the viewing device for interaction with by the user, as described above in connection with FIGS. 2 and 4-6.

What is claimed is:

1. A system for processing, storage, distribution, and interaction with electronic images, comprising:

a cloud service for storing source-and-content-verifiable images, processing the source-and-content-verifiable images to create source-and-content-verifiable interactive images having embedded interactive features, distributing the interactive images;

a programmable electronic imaging device arranged to create an image, said imaging device including a memory for storing imaging software made up of a set of instructions executed by a processor for creating the image, steganographically marking the image to create one of said source-and-content verifiable images, and securely transmitting the source-and-content-verifiable image to said cloud service;

a programmable electronic viewing device arranged to view images, said viewing device including a memory for storing viewing software made up of a set of instructions executed by a processor for capturing, viewing, and interacting with one of said interactive images, wherein said cloud service includes programmable computing devices for constructing and maintaining data structures, generating said interactive features based on said data structures, and embedding the interactive features in the source-and-content-verifiable images to create the interactive images, and transmitting one of said interactive images to said viewing device, wherein said data structures constructed and maintained by the cloud service include the following data structures:

a. a picture interaction data structure (PIDS) that captures and records ongoing interactions that happen between image viewers and image authors/facilitators relative to an image;

b. a user interaction data structure (UIDS) that contains a user's identification information and preferences, and pointers to images with which the user has interacted; and c. a picture-generated recursive data structure (PRIDS) relative to any given image, the PRIDS containing the PIDS of the image and the UIDS of the users who have interacted with the image, which in turn contains the PIDS's of all other images with which the users have interacted, which in turn contains the UIDS's of users that have interacted with those images, wherein the interactive features embedded in the interactive images are based on the PRIDS and therefore include information on all users who have interacted with a respective interactive image, wherein the viewing software instructions executed by the processor of the viewing device include instructions for enabling a user of the viewing device to select a communication option upon interaction of the user of the viewing device with the respective interactive image, and wherein upon selection of the communication option, a communication channel is opened between the user of the viewing device and one or more of said users who have authored, facilitated, or interacted with the respective interactive image.

2. The system for processing, storage, distribution, and interaction with electronic images as claimed in claim 1, wherein the imaging device is a smartphone or tablet.

3. The system for processing, storage, distribution, and interaction with electronic images as claimed in claim 1, wherein the viewing device is a smartphone, tablet, or personal computer (PC).

4. The system for processing, storage, distribution, and interaction with electronic images as claimed in claim 1, wherein the imaging software includes instructions for, when a user of the imaging device has not previously registered with the cloud service, carrying out the steps of:
   obtaining a unique device identifier of the imaging device;
   collecting said identification information and preferences of the user;
   generating a private/public key pair; and
   transmitting the unique device identifier, the identification information and preferences of the user, and a public key of the private/public key pair to the cloud service.

5. The system for processing, storage, distribution, and interaction with electronic images as claimed in claim 1, wherein the instructions for steganographically marking the image created by the imaging software include instructions for generating a unique random identifier (URI) and steganographically marking the created image with the URI.

6. The system for processing, storage, distribution, and interaction with electronic images as claimed in claim 5, wherein the URI is generated by first generating a true random number (TRN) based on random variations of signals within the imaging device, and then using the TRN as a random selector to select a HUGO-like steganographic marking algorithm from among a suitably parameterized infinite class of such algorithms, the selected HUGO-like steganographic marking algorithm being applied to the image created by the imaging software to create the source-and-content-verifiable image securely transmitted to the cloud service.

7. The system for processing, storage, distribution, and interaction with electronic images as claimed in claim 5, wherein the imaging software further includes instructions for creating a quick reference number (QRN) and steganographically marking the created image with the QRN.

8. The system for processing, storage, distribution, and interaction with electronic images as claimed in claim 7, wherein the QRN is a true random number (TRN) based on random variations of signals within the imaging device.

9. The system for processing, storage, distribution, and interaction with electronic images as claimed in claim 1, wherein the imaging software further includes instructions for collecting metadata concerning an image created by the imaging software.

10. The system for processing, storage, distribution, and interaction with electronic images as claimed in claim 9, wherein the metadata includes a time and date and geographic location data.

11. The system for processing, storage, distribution, and interaction with electronic images as claimed in claim 10, wherein the metadata further includes EXIF data for photos and EXIF-like data for videos.

12. The system for processing, storage, distribution, and interaction with electronic images as claimed in claim 9, wherein the imaging software further includes instructions for using a private key of a private/public key pair to generate a metadata digital signature from said metadata, and wherein said metadata and metadata digital signature are securely transmitted together with the steganographically marked image created by the imaging software to form said source-and-content verifiable image.

13. The system for processing, storage, distribution, and interaction with electronic images as claimed in claim 12, wherein the source-and-content-verifiable image is securely transmitted to the cloud service by a session key generated by the imaging software and unique to the source-and-content verifiable image.

14. The system for processing, storage, distribution, and interaction with electronic images as claimed in claim 13, wherein the transmission of the source-and-content verifiable image to the cloud service further includes transmission of a quick reference number (QRN) steganographically marked in the source-and-content verifiable image and the session key, which has been encrypted with a private key of a private/public key pair.

15. The system for processing, storage, distribution, and interaction with electronic images as claimed in claim 1, wherein the viewing software includes instructions for enabling a user of the viewing device to select an image and, if the image includes said interactive features, producing a menu of picture interaction options which includes said communication option.

16. The system for processing, storage, distribution, and interaction with electronic images as claimed in claim 15, wherein said picture interaction options include an option of displaying a set of pictures related to the selected interactive image, each of the pictures also including interactive features.

17. The system for processing, storage, distribution, and interaction with electronic images as claimed in claim 16, wherein the set of pictures related to the selected interactive image are related by author.

18. The system for processing, storage, distribution, and interaction with electronic images as claimed in claim 15, wherein the options including displaying communication methods by which the viewer may communicate with said one or more of said persons who have authored, facilitated, or interacted with the selected interactive image.

19. The system for processing, storage, distribution, and interaction with electronic images as claimed in claim 18, wherein said communication methods include at least one of texting, e-mail, and social media.

20. The system for processing, storage, distribution, and interaction with electronic images as claimed in claim 15, wherein the viewing software further includes instructions for, if the selected image does not include said interactive features, transmitting the selected image to the cloud service for processing to include said interactive features.

21. The system for processing, storage, distribution, and interaction with electronic images as claimed in claim 20,
   wherein upon receipt of the selected image, the cloud service determines whether the viewer of the selected image is a registered facilitator,
   wherein if the viewer selected image is a registered facilitator, the cloud service updates the user's UIDS to include a pointer to the selected image, and
   wherein if the viewer of the selected image is not a registered facilitator, the cloud service registers the viewer of the selected image to obtain said user identification information and preferences for inclusion in a UIDS of the user.

22. The system for processing, storage, distribution, and interaction with electronic images as claimed in claim 1, wherein the cloud service includes:
   a key server for managing keys and carrying out encryption/decryption operations including decrypting communications from said imaging device, and recovering watermarks and metadata from source-and-content-verifiable images received from said imaging device;

a user identity and preference management server for storing user identifiers and preferences received from users during a registration process;

a metadata storage server for storing said metadata recovered from the source-and-content verifiable images;

an imagery server for storing images, including said interactive images; and a data structures server for creating and updating said data structures used to generate said interactive features.

23. The system for processing, storage, distribution, and interaction with electronic images as claimed in claim 1, wherein said cloud service further comprises an analytics service for tracking the appearance of said pictures across the internet.

24. The system for processing, storage, distribution, and interaction with electronic images as claimed in claim 23, wherein the cloud service controls web crawling servers that create a Web Appearance Data Structure (WADS) providing a record and statistical analysis of web appearances by picture, author and facilitator.

25. A cloud service for storing source-and-content-verifiable images, processing the source-and-content-verifiable images to create source-and-content-verifiable interactive images having embedded interactive features, and distributing the interactive images, comprising:

programmable computing devices for constructing and maintaining data structures, generating said interactive features based on said data structures, and embedding the interactive features in the source-and-content-verifiable images to create the interactive images, and transmitting one of said interactive images to a viewing device that includes viewing device software, wherein said data structures constructed and maintained by the cloud service include the following data structures:

a. a picture interaction data structure (PIDS) that captures and records ongoing interactions that happen between image viewers and image authors/facilitators relative to an image;

b. a user interaction data structure (UIDS) that contains a user's identification information and preferences, and pointers to images with which the user has interacted; and c. a picture-generated recursive data structure (PRIDS) relative to any given image, the PRIDS containing the PIDS of the image and the UIDS of the users who have interacted with the image, which in turn contains the PIDS's of all other images with which the users have interacted, which in turn contains the UIDS's of users that have interacted with those images, wherein the interactive features embedded in the interactive images are based on the PRIDS and therefore include information on all users who have interacted with a respective interactive image, wherein the viewing device software includes instructions executed by a processor of the viewing device for enabling a user of the viewing device to select a communication option upon interaction of the user of the viewing device with the respective interactive image, and wherein upon selection of the communication option, a communication channel is opened between the user of the viewing device and one or more of said users who have authored, facilitated, or interacted with the respective interactive image.

26. The cloud service as claimed in claim 25, wherein the programmable computing devices of the cloud service include:

a key server for managing keys and carrying out encryption/decryption operations including decrypting communications from said imaging device, and recovering watermarks and metadata from source-and-content-verifiable images received from said imaging device;

a user identity and preference management server for storing user identifiers and preferences received from users during a registration process;

a metadata storage server for storing said metadata recovered from the source-and-content verifiable images;

an imagery server for storing images, including said interactive images; and a data structures server for creating and updating said data structures used to generate said interactive features.

27. The cloud service as claimed in as claimed in claim 25, wherein said cloud service further comprises an analytics service for tracking the appearance of said pictures across the internet.

28. The cloud service as claimed in as claimed in claim 27, wherein the cloud service controls web crawling servers that create a Web Appearance Data Structure (WADS) providing a record and statistical analysis of web appearances by picture, author and facilitator.

29. A method of cloud service for storing source-and-content-verifiable images, processing the source-and-content-verifiable images to create source-and-content-verifiable interactive images having embedded interactive features, and distributing the interactive images, comprising the computer-implemented steps of:

constructing and maintaining data structures;

generating said interactive features based on said data structures, and embedding the interactive features in the source-and-content-verifiable images to create the interactive images and transmitting one of said interactive images to a viewing device, enabling a user of the viewing device to select a communication option upon interaction of the user of the viewing device with the respective interactive image, and upon selection of the communication option, opening a communication channel between the user of the viewing device and one or more of users who have authored, facilitated, or interacted with the respective interactive image wherein said data structures include the following data structures:

a. a picture interaction data structure (PIDS) that captures and records ongoing interactions that happen between image viewers and image authors/facilitators relative to an image;

b. a user interaction data structure (UIDS) that contains a user's identification information and preferences, and pointers to images with which the user has interacted; and c. a picture-generated recursive data structure (PRIDS) relative to any given image, the PRIDS containing the PIDS of the image and the UIDS of the users who have interacted with the image, which in turn contains the PIDS's of all other images with which the users have interacted, which in turn contains the UIDS's of the users that have interacted with those images,
wherein the interactive features embedded in the interactive images are based on the PRIDS and therefore include information on all users who have interacted with a respective interactive image.

\* \* \* \* \*